(No Model.) 3 Sheets—Sheet 3.
J. PLEUKHARP.
STAVE MAKING MACHINE.

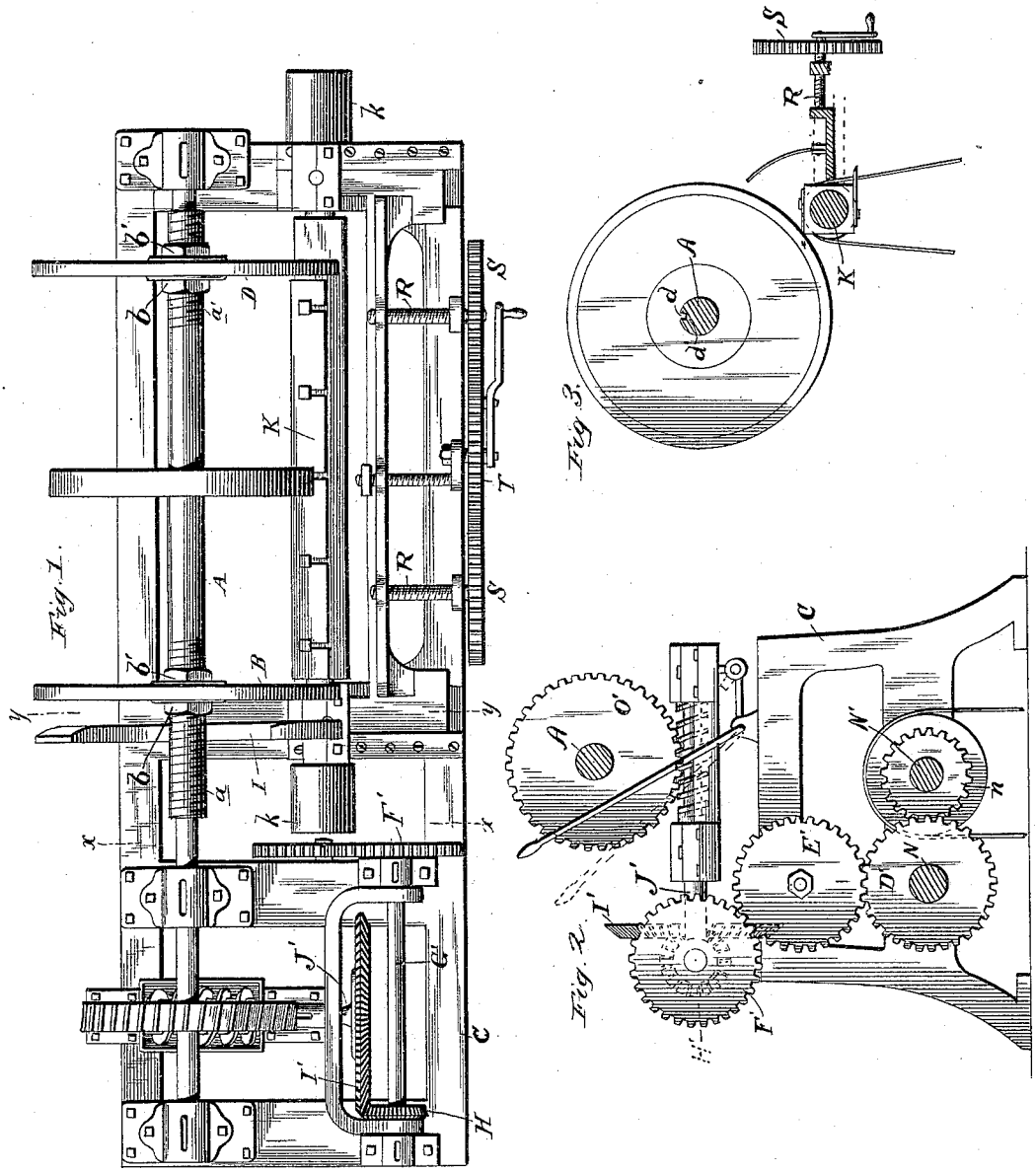

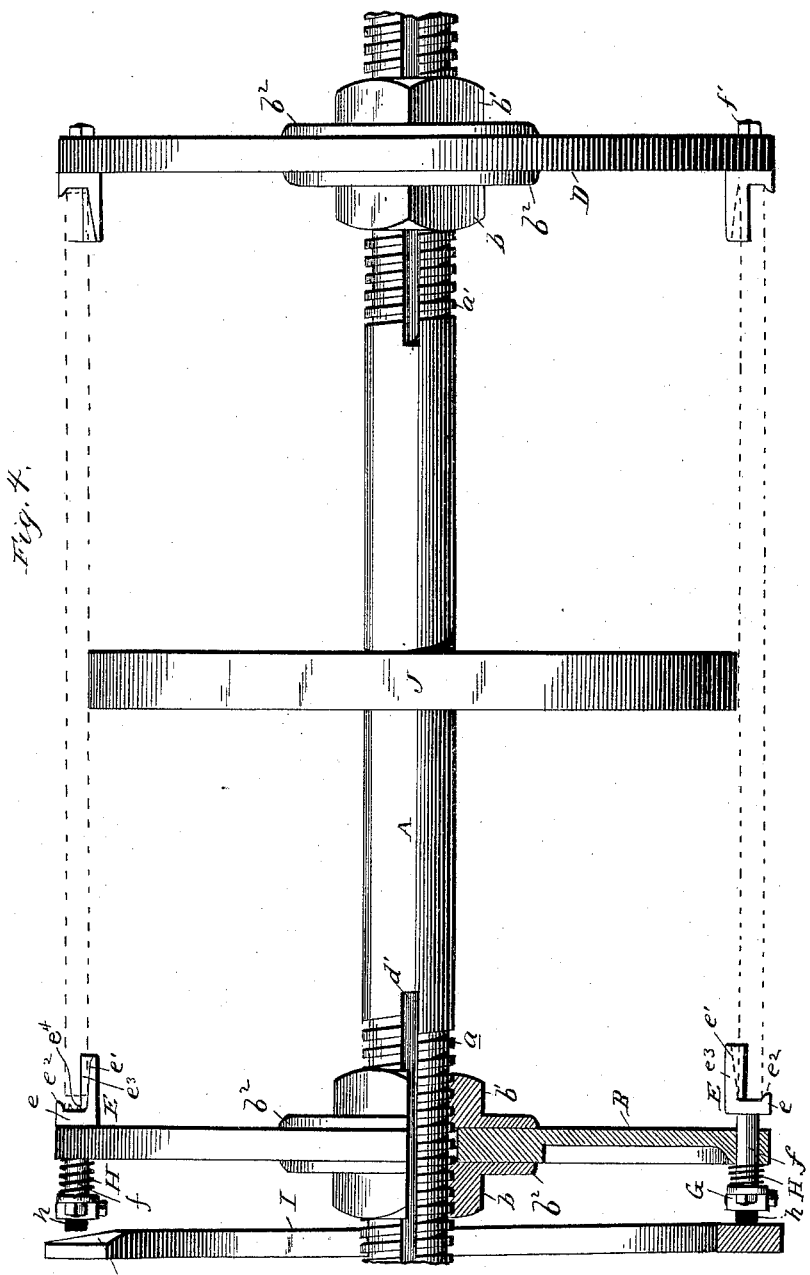

No. 415,558. Patented Nov. 19, 1889.

Witnesses

Inventor
James Pleukharp.
By his Attorneys
R. S. & A. P. Lacey.

UNITED STATES PATENT OFFICE.

JAMES PLEUKHARP, OF COLUMBUS, OHIO.

STAVE-MAKING MACHINE.

SPECIFICATION forming part of Letters Patent No. 415,558, dated November 19, 1889.

Application filed February 12, 1889. Serial No. 299,621. (No model.)

*To all whom it may concern:*

Be it known that I, JAMES PLEUKHARP, a citizen of the United States, residing at Columbus, in the county of Franklin and State of Ohio, have invented certain new and useful Improvements in Stave-Making Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to stave-making machines for finishing the outside of dimension stock which has been sawed or split and finished on the inside by an ordinary cylinder-planer in the required shape for a finished barrel. The object of thus forming the staves is to have them all of a size, whereby a barrel of standard size can be readily formed.

The improvement consists of the novel features and the peculiar construction and combination of the parts, which will be hereinafter more fully described and claimed, and which are shown in the annexed drawings, in which—

Figure 5:
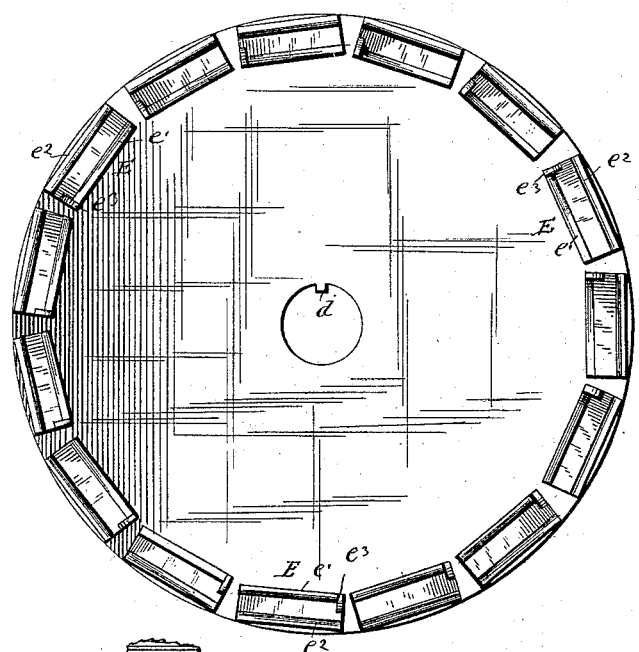
Figure 6:
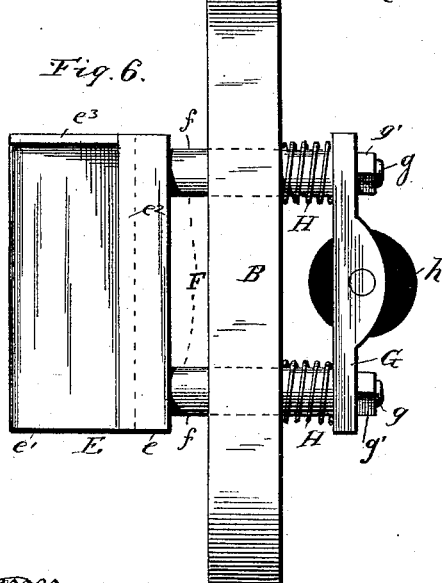
Figure 7:
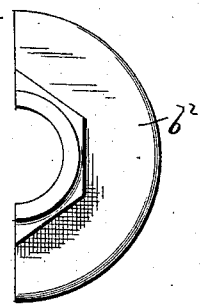

Figure 1 is a top plan view of a machine embodying my invention; Fig. 2, a section on the line X X of Fig. 1, looking to the left; Fig. 3, a section on the line Y Y of Fig. 1, looking to the right, showing the manner of rotating the cutter-head; Fig. 4, a top plan view, parts being broken away, of the main shaft, the stave-supporting heads, and holders on an enlarged scale, showing the manner of securing the staves in position; Fig. 5, an inside view of the stave-supporting heads; Fig. 6, a top plan view of the movable stave-holders, on an enlarged scale, and Fig. 7, a detail view of the flanged lock-nuts.

The main shaft A is journaled at its ends and between its ends in suitable bearings on the frame C, which is of common construction, being adapted to support the working parts of the machine. This shaft has threaded portions $a$ and $a'$ near each end, on which are mounted the heads B and D, respectively, being adjustably held thereon between the flanged nuts $b$ and $b'$. The heads are prevented from turning on the shaft by a feather-and-spline connection $d$ and $d'$. Each of the heads is provided with a corresponding number of stave-holders, which are constructed substantially alike, being composed of a head E and shank F, which latter is preferably composed of two stems $f\,f$, that pass through openings in the head. The holders on one head, as D, are fixed; hence the shanks are short and held fast by the nuts $f'$ on their threaded ends. The holders on the head B are movable in and out or to and from the holders on the head D to clamp and release the staves; hence their shanks are made sufficiently long to admit of this movement. The outer ends of the stems $f\,f$ of the movable holders are reduced and threaded, as shown at $g$, and are coupled together by the yoke G, which is held thereon by the nuts $g'$. The springs H, placed on the stems and arranged between the head B and the yokes G, force the latter out and hold the heads E against the head B. The yoke G is made heavy midway of its ends to receive the journals of the roller $h$, which is adapted to travel on the track I, that is provided and mounted on the frame to force the holders in and clamp the staves. The head of the holders is composed of the vertical plate $e$; the inner horizontal ledge $e'$, which is beveled on its upper side, as shown; the retaining-flange $e^2$, beveled on its inner side, and the vertical flange $e^3$, for limiting the inward movement of the staves. By having the flange $e^2$ and the ledge $e'$ beveled on their opposing sides the ends of the staves will be guided in between them and be held firmly. The spurs $e^4$, entering the ends of the staves, will hold the latter more securely in place.

The track I extends only about two-thirds the distance around and is beveled at each end on the side opposing the head B. The bevel on the front end $i$ is gradual, to force the holder on the end of the stave slowly.

The support J, arranged on the shaft A between the heads B and D, supports the staves at their middle.

The revolving cutter-head K, its operating and adjusting mechanism, as also the driving mechanism for rotating the shaft A, are old and well known, being fully described in my patent, No. 296,448, issued April 8, 1884, and may be briefly referred to as follows: The worm gear-wheel O' on the shaft A meshes with the worm or screw shaft J', that is provided with the bevel gear-wheel I', which meshes with the bevel-pinion H' on the shaft G'. The counter-shafts N and N' are geared together by the gear-wheels D' and $n$, and the idle gear-wheel E' transmits motion from gear-wheel D' to gear-wheel F' on the shaft G'.

The cutter-head K receives its motion from the pulleys $k$, which receive their motion from the usual counter-shaft, (not shown,) and is adjusted back and forth by the screws R and the gear-wheels S S and T.

The operation of the machine is as follows: The shaft A is set in motion and revolves slowly, carrying the staves against the rapidly-revolving cutter-head K, the staves being fed in between the holders while the latter are traversing the space between the ends of the track I. As the shaft A revolves, the roller $h$ of the holder will engage with the beveled end of the track I, and, riding thereon, force the holder in and clamp the stave. When the holder nears the other end of the track and begins to leave the same, the springs H will force the holder out and release the finished stave. The head B is adjustable to and from the track, so that the holders will be held the proper distance from the track and will have the necessary movement to clamp the staves. The head D is adjustable on the shaft to accommodate different lengths of staves.

The heads B and D are adapted to move freely on the threaded ends of the shaft A, and are held from turning on said shaft by the feather-and-spline connection, and adjusted thereon by the flanged nuts hereinbefore specified. The flanges $b^2$ of the nuts $b$ and $b'$ are provided to obtain a broad purchase on the heads.

Having thus described my invention, what I claim, and desire to secure by Letters Patent, is—

1. In a stave-making machine, the combination, with the revolving shaft and the heads B and D at opposite ends of the head, of a series of independent stave-holders mounted on said heads, the holders on one head being directly opposite the holders on the other head, each holder comprising a shank F, a plate $e$ at right angles to the head, the supporting-edge $e'$, projecting from inner edge of the plate $e$, the flange $e^2$, extending from the outer edge of plate $e$ parallel with ledge $e'$, and the flange $e^3$, projected from the rear edge of ledge $e'$ across the space between the ledge $e'$ and flange $e^2$, substantially as and for the purpose described.

2. The combination, with the shaft and the heads, of the stave-holders secured to the heads and comprising the plate $e$, the ledge $e'$, the flange $e^2$, and the flange $e^3$, the flange $e^2$ and the ledge $e'$ being beveled on their opposing sides, substantially as set forth.

3. The combination, with the shaft and the track I, of the head D, having holders, and the head B, having independent movable holders and adjustable to and from the track I, substantially as described.

4. The combination, with the shaft having threaded portions near each end, of the heads mounted on the said threaded portions and held thereon against turning by feather and spline and having corresponding stave-holders, of the flanged nuts $b$ and $b'$—one on each side of the heads—for holding and adjusting the heads on the said shaft, substantially as and for the purpose described.

5. The combination, with the head, of the stave-holder having a shank composed of two stems, the yoke having a roller, and the springs H, substantially as set forth.

6. The hereinbefore-specified stave-holder, comprising shank F, plate $e$, ledge $e'$, and flange $e^2$ at opposite edges of plate $e$, the spurs $e^4$ between the said ledge and flange, and the flange $e^3$ at the rear edge of ledge $e'$, substantially as set forth.

In testimony whereof I affix my signature in presence of two witnesses.

JAMES PLEUKHARP.

Witnesses:
J. R. BOWELLE,
W. T. PRICE.